(12) United States Patent
Martindale et al.

(10) Patent No.: US 6,580,256 B1
(45) Date of Patent: Jun. 17, 2003

(54) SYSTEM AND METHOD FOR REMOTE REGULATION OF A SWITCHING POWER CONVERTER

(75) Inventors: W. Kenneth Martindale, Malabar, FL (US); David K. Vail, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/017,602

(22) Filed: Dec. 18, 2001

(51) Int. Cl.$^7$ .............................. G05F 1/40; G05F 1/44
(52) U.S. Cl. ..................... 323/280; 323/281; 323/284
(58) Field of Search ................................. 323/282, 284, 323/285, 280, 281

(56) References Cited

U.S. PATENT DOCUMENTS

| | | | |
|---|---|---|---|
| 3,818,274 A | 6/1974 | DeWitte et al. | |
| 4,150,424 A | 4/1979 | Nuechterlein | |
| 4,301,497 A | 11/1981 | Johari | |
| 4,672,518 A | 6/1987 | Murdock | |
| 4,823,070 A | * 4/1989 | Nelson | 323/285 |
| 5,408,173 A | 4/1995 | Knapp | |
| 5,508,603 A | 4/1996 | Strong, III | |
| 5,680,036 A | * 10/1997 | Faulk | 323/282 |
| 5,717,578 A | * 2/1998 | Afzal | 320/111 |
| 5,994,885 A | * 11/1999 | Wilcox et al. | 323/285 |
| 6,130,528 A | * 10/2000 | Aoyama | 323/282 |
| 6,366,066 B1 | * 4/2002 | Wilcox | 323/282 |
| 6,469,914 B1 | * 10/2002 | Hwang et al. | 363/21.01 |

\* cited by examiner

*Primary Examiner*—Bao Q. Vu
(74) *Attorney, Agent, or Firm*—Duane Morris LLP

(57) ABSTRACT

A system and method for remote regulation of a switching power converter operating relative to a second ground is disclosed where a control signal is produced by comparing the line voltage relative to a first ground with a reference voltage relative to the first ground to produce a first error signal relative to the first ground, translating the first error signal to a second error signal relative to a second ground, and applying the second error signal to the switching power converter to thereby regulate the switching power converter as a function of the line voltage.

21 Claims, 2 Drawing Sheets

SYSTEM AND METHOD FOR REMOTE REGULATION OF A SWITCHING POWER CONVERTER

BACKGROUND OF THE INVENTION

The present invention relates to regulating the output voltage of adaptive power supplies, switching power converters, and similar pieces of equipment within tightly-controlled specifications. The disclosed remote regulation system achieves highly accurate output voltage which is required for high-reliability systems. Specifically, one embodiment of the invention relates to a system and method for regulating a switching power converter operating relative to a local ground, where the input for the regulation loop is a line voltage measurement taken at a point where the relative line ground may be different than the local ground. Typically, the line voltage measurement is taken from a position that is quite remote from the power converter. One method disclosed herein for maintaining the line voltage within tightly-controlled parameters is to compare the line voltage with a known reference voltage relative to the line ground where the line voltage measurement is taken. The resultant error signal, which is relative to the line ground is then translated to a control signal which is relative to the local ground. The control signal is then applied to the power converter to thereby control the power converter, and hence the remote line voltage, with precision not achievable with prior art regulation systems and methods.

Prior art systems and methods either cannot achieve tight control of output voltage from a power supply at a remote location or must use a complex power distribution design, thereby increasing the cost of the system, in order to maintain the required output voltage within specific design parameters. It is to be understood that the term "power supply" as used herein may relate to any type of electrical power supply such as, but not limited to, adaptive power supplies, switching power converters, and power conditioning units. The invention is in no way limited to a particular "power supply".

As used herein, remote power supply regulation refers to sensing the output voltage from a power supply at a remote location. "Remote location" should be understood to mean anywhere where the measured line voltage is relative to a line ground that may be different than the power supply ground. Typically, the line ground is different, i.e., "floats", relative to the power supply ground where the line voltage measurement is taken at a large distance from the power supply, such as at the end of long cables that are attached at the other end to the power supply to be regulated. The internal line resistance in long cables is a typical cause for the line ground at the voltage measurement point to be different than the power supply ground. However, anywhere where the line ground at the point of line voltage measurement may be different than the power supply ground may be a "remote location" as defined herein.

A typical prior art solution to remote power supply regulation comprises a remote sense amplifier and an error amplifier connected to a reference voltage. Typically, but not necessarily, the remote sense amplifier and the error amplifier are physically located near the power supply to be regulated. Therefore, it is convenient to have the reference voltage relative to the local ground, i.e., power supply ground. Such a design requires that the voltage being compared to the reference voltage be relative to the same ground to which the reference voltage is relative. Therefore, typical prior art remote regulation systems first translate the line voltage, which is relative to the line ground, to a voltage that is relative to the power supply ground via the remote sense amplifier. After the measured line voltage is converted, the resultant voltage is then compared to the reference voltage via the error amplifier resulting in a control signal relative to the power supply ground. The control signal is then applied to the power supply so as to effect control on the power supply as a function of the measured line voltage.

The remote sense amplifier typically has an input resistor divider network. The resistor divider network adds errors to the measured line voltage signal passing through the network due principally to resistor variations. Additionally, the remote sense amplifier itself adds errors due to offsets and bias currents. Therefore, the voltage produced at the output of the remote sense amplifier is comprised of the translated measured line voltage plus some unknown error voltage. The remote sense amplifier output voltage, including the error voltage, is then applied to the error amplifier for comparison with the reference voltage. The resultant control signal produced by the error amplifier is, in part, a function of the unknown and possibly varying errors in the remote sense amplifier and its input resistor network. These errors have also been amplified by the error amplifier. Consequently, the tolerances that can be achieved by such a prior art system are limited by the introduction of the errors introduced by the remote sense amplifier and its input resistor network.

As an example, consider the typical prior art design of a remote regulated power supply shown in FIG. 1. Typical for such a device, the worst-case power supply voltage accuracy of 3.3 volts ±4% at the remote sensing point ($V_{out}$) is achievable. If one component in an operating system which is supplied by the power supply of FIG. 1 requires that its supplied voltage be within ±5% of nominal, then the power distribution losses from the remote sense point must be less than 1%. If the operating system requires a total power supply current of 3.3 volts at 100 amps, a 1% variance is equivalent to 33 mV or 330 micro ohms. Such tight tolerances require a complex, and very expensive power distribution design as well as precision components.

The present invention overcomes the limitations of the prior art by placing the error amplifier, with a reference voltage relative to the line ground, upstream of the remote sense amplifier. This configuration avoids amplifying the unknown errors produced by the remote sense amplifier due to offsets and bias currents. The inventive design significantly improves the accuracy achievable by the remote regulator.

Accordingly, it is an object of the present invention to obviate many of the above problems in the prior art and to provide a novel system and method for the remote regulation of a power supply, such as, for example, an adaptable power supply or a switching power converter It is another object of the present invention to provide a novel system and method for producing a control signal responsive to the difference between the magnitude of an attribute of a first signal with the magnitude of an attribute of a second signal.

It is yet another object of the present invention to provide a novel system and method for maintaining the line voltage between two terminals that are connected to but remote from a power supply where the voltage between the line ground and the power supply ground is non-zero.

It is still another object of the present invention to provide a novel system and method for maintaining the line voltage between two terminals that are connected to but remote from a power supply where the electrical potential of the line ground is greater than the electrical potential of the power supply ground.

It is a further object of the present invention to provide a novel system and method for producing a control signal responsive to the line voltage between a first and second signal where the line voltage is compared to a reference voltage to produce an error voltage and the error voltage is compared to the voltage between the line ground and a local ground so as to translate the error voltage from being relative to the line ground to being relative to the local ground to thereby produce a control signal responsive to the line voltage.

It is yet a further object of the present invention to provide a novel system and method for controlling the output of an adaptable power supply including a remote sense feedback amplifier in series with an error amplifier where the remote sense feedback amplifier is downstream of the error amplifier.

It is still a further object of the present invention to provide a novel system and method for regulating the output of an adaptive power supply as a function of a line voltage measure between a pair of conductors connected to the power supply at a point where the voltage between the ground reference at the point of the line voltage measurement and the ground reference at the power supply is non-zero.

It is an additional object of the present invention to provide a novel system and method for regulating the output of an adaptive power supply at a second ground including measuring the line voltage relative to a first ground, comparing the line voltage with a reference voltage relative to the first ground to produce a first error voltage relative to the first ground, translating the first error voltage to a second error voltage relative to the second ground, and applying the second error signal to the adaptive power supply to regulate the power supply as a function of the line voltage.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

With reference to the drawings, like numerals and component designations represent like components throughout the two drawings.

Figure 1:
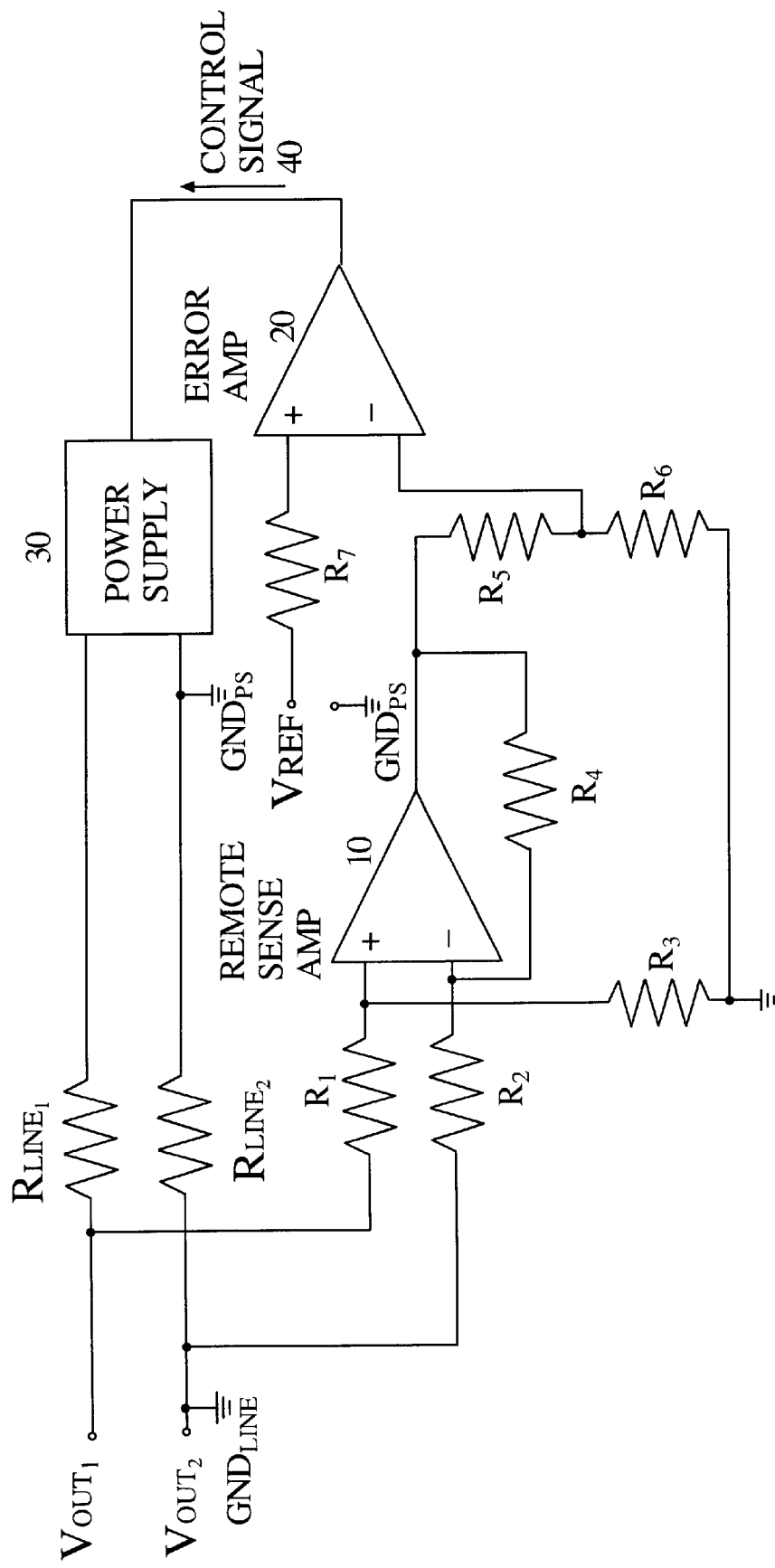
FIG. 1 is a schematic circuit diagram of a prior art remote regulator showing a remote sense amplifier upstream of an error amplifier with a reference voltage relative to the power supply ground.

With reference to FIG. 1, a schematic circuit diagram of a prior art remote regulator is depicted. The power supply 30 operates at a local ground $GND_{PS}$ and has two output lines, one at each of two output terminals, that extend to a remote sense point where $V_{OUT1}$ and $V_{OUT2}$ may be measured. The remote sense point is relative to the line ground $GND_{LINE}$ which is separated by the line resistances $R_{LINE1}$ and $R_{LINE2}$ from the power supply ground $GND_{PS}$ and therefore $GND_{LINE}$ and $GND_{PS}$ may not be at the same electrical potential. As shown in FIG. 1, $V_{OUT2}$ may be at $GND_{LINE}$ potential. The line voltage is measured between $V_{OUT1}$ and $V_{OUT2}$.

The line voltage is applied to the remote sense amplifier 10 through input resistors R1 and R2. A feedback loop including resistor R4 may be included as shown in FIG. 1. Another feedback loop including resistors R3, R5 and R6 may also be included as shown. The remote sense amplifier 10 translates the line voltage, which is relative to the line ground $GND_{LINE}$, to a voltage that is relative to the power supply ground $GND_{PS}$. As discussed above, the resistor network may add an error voltage to the output of the remote sense amplifier. Additionally, offsets and bias current errors in the remote sense amplifier 10 may add an additional error voltage to the output voltage of the remote sense amplifier.

The output voltage of the remote sense amplifier 10, including the line voltage and error components, is applied to the error amplifier 20 through the voltage divider network $R_5$ and $R_6$. The error amplifier 20 compares the voltage-divided output of the remote sense amplifier with a reference voltage $V_{REF}$, through resistor $R_7$, which is relative to the power supply ground $GND_{PS}$ as shown in FIG. 1. The error amplifier 20 produces the control signal 40 which is then applied to the power supply 30. Ideally, the control signal 40 regulates the power supply 30 as a function of the line voltage. However, as discussed above, the control signal is partially a function of the errors introduced to the line voltage signal due to the remote sense amplifier and its resistor network. Therefore, the accuracies that are attainable with the prior art remote regulator of FIG. 1 are inadequate for high-reliability systems.

Figure 2:
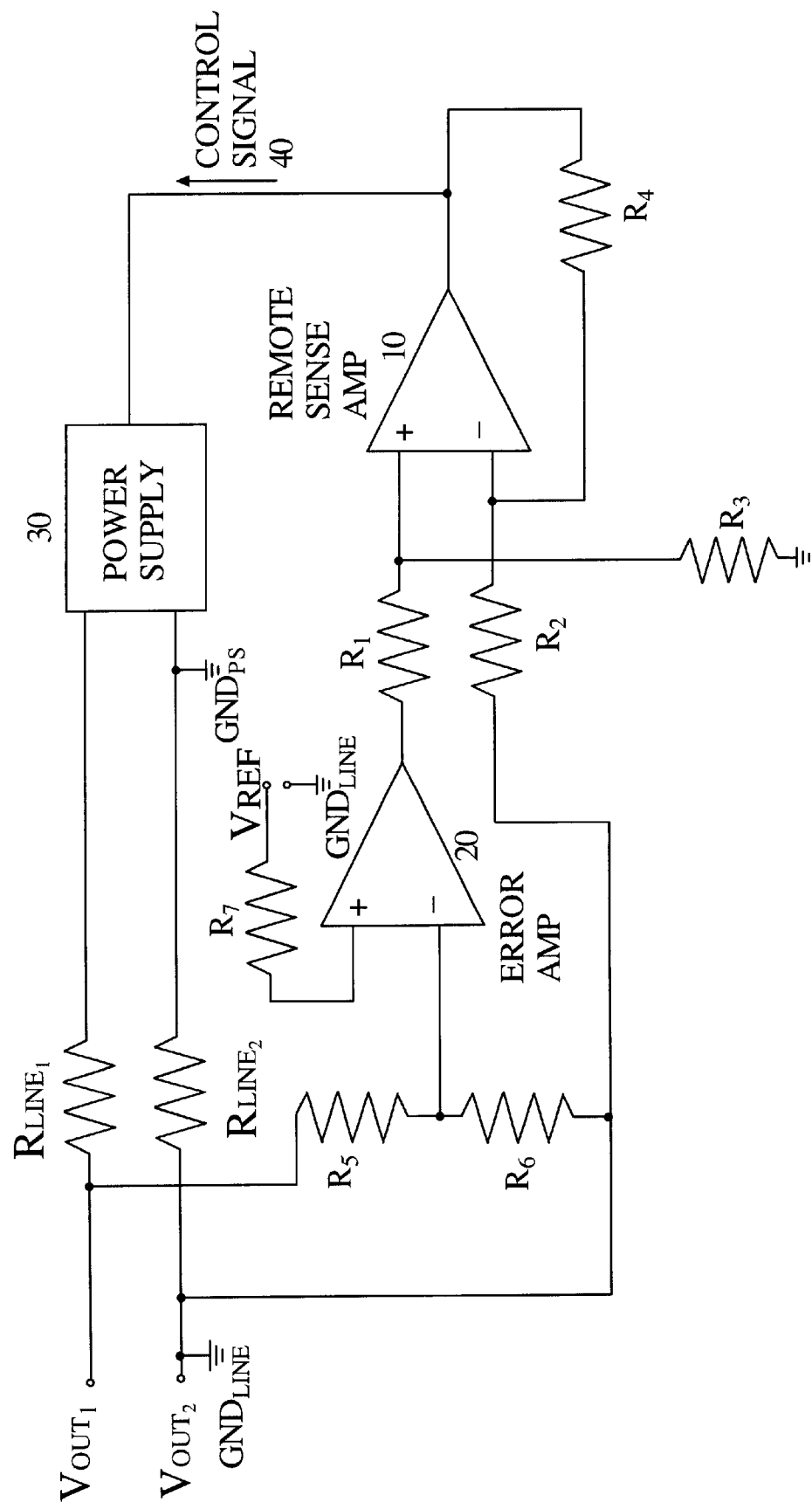
FIG. 2 is a schematic circuit diagram of an embodiment of the present invention showing the remote sense amplifier downstream of the error amplifier with a reference voltage relative to the line voltage ground.

With reference now to the embodiment of the present invention shown in FIG. 2 in schematic circuit diagram form, like numerals and component designations represent like components with FIG. 1. The embodiment shown in FIG. 2 comprises the remote sense amplifier 10 downstream of the error amplifier 20. Furthermore, the voltage reference $V_{REF}$ is relative to the line ground $GND_{LINE}$, not the power supply ground $GND_{PS}$ as was the case with the prior art device in FIG. 1.

The line voltage, the potential across $V_{OUT1}$ and $V_{OUT2}$, is measured and applied to the error amplifier 20 through the voltage divider network of $R_5$ and $R_6$. The error amplifier 20 compares the line voltage with the reference voltage $V_{REF}$, applied through resistor $R_7$. The error signal produced by the error amplifier 20 is then applied to the remote sense amplifier 10 so that the error signal, which is relative to the line ground $GND_{LINE}$ can be converted to the control signal 40 that is relative to the power supply ground $GND_{PS}$. The control signal 40 is then applied to the power supply 30 so as to control the output of the power supply as a function of the line voltage.

By placing the error amplifier, with a reference voltage relative to the line ground, upstream of the remote sense amplifier the accuracy of the remote regulator is significantly improved. For the inventive design shown in the remote regulated power supply shown in FIG. 2, the worst-case power supply voltage accuracy of 3.3 ±2% at the remote sensing point ($V_{OUT}$) is achievable. The corresponding power distribution loss budget is now 3% (5% nominal design requirement minus 2% accuracy) or 990 micro ohms. This results in a significantly less complex, and significantly less costly, power distribution design. The invention achieves this benefit without the use of ultra-precision resistors and without affecting the other elements of the power supply design.

The embodiment of the present invention shown in FIG. 2 applies the measured line voltage signal first to the error amplifier to compare the line voltage with the reference voltage and then to the remote sense amplifier to convert the relative ground reference from the line ground to the power supply ground. Processing the measured line voltage first through the error amplifier reduces the remote sense amplifier errors by the open loop gain of the error amplifier.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A circuit for producing a signal responsive to the difference between the magnitude of a predetermined attribute of a first signal and the magnitude of a predetermined attribute of a second signal comprising:
   a first electrical device for comparing the difference between:
      the magnitude of a predetermined attribute of a predetermined reference signal that is independent of said first signal and said second signal, and
      the magnitude of a predetermined attribute of a third signal that is a function of said first signal to thereby produce an error signal; and
   a second electrical device for comparing the difference between:
      the magnitude of a predetermined attribute of said error signal, and
      the magnitude of a predetermined attribute of said second signal,
   to thereby produce the signal that is responsive to the difference between the magnitude of said predetermined attribute of said first signal and the magnitude of said predetermined attribute of said second signal.

2. The circuit of claim 1 wherein said predetermined attribute is voltage.

3. The circuit of claim 1 wherein said second electrical device includes a feedback loop.

4. The circuit of claim 1 wherein said third signal is a function of said second signal.

5. The circuit of claim 1 wherein said third signal is a function of said first signal and said second signal.

6. The circuit of claim 1 wherein said first electrical device is a differential amplifier.

7. The circuit of claim 6 wherein said second electrical device is a differential amplifier.

8. The circuit of claim 7 wherein said second electrical device includes a feedback loop.

9. The circuit of claim 1 wherein said control signal drives a power supply responsive to a predetermined attribute of said control signal to thereby modify the output of said power supply.

10. In a circuit for maintaining a voltage between a first output terminal connected to and spaced apart from a power supply and a second output terminal connected to and spaced apart from said power supply where the voltage between the ground reference at said output terminals and the ground reference at said power supply is non-zero, comprising:
   a first comparing circuit for translating a voltage measured at said output terminals relative to the ground at said output terminals to a voltage relative to the ground at said power supply; and
   a second comparing circuit for comparing the voltage at said output terminals to a predetermined reference voltage,
   the improvement wherein said second comparing circuit is upstream of said first comparing circuit.

11. The circuit of claim 10 wherein said first comparing circuit is a differential amplifier.

12. The circuit of claim 10 wherein said second comparing circuit is a differential amplifier.

13. The circuit of claim 10 wherein the electrical potential of said ground at the output terminals is greater than the electrical potential of said ground at said power supply.

14. A method for producing a signal responsive to the difference between the magnitude of a predetermined attribute of a first signal and the magnitude of a predetermined attribute of a second signal comprising:
   comparing the difference between (a) the magnitude of a predetermined attribute of a predetermined reference signal that is independent of said first signal and said second signal, and (b) the magnitude of a predetermined attribute of a third signal that is a function of said first signal to thereby produce an error signal; and
   comparing the difference between (c) the magnitude of a predetermined attribute of said error signal, and (d) the magnitude of a predetermined attribute of said second signal;
   to thereby produce the signal.

15. In a system for controlling the output of an adaptable power supply including a remote sense feedback amplifier in series with an error amplifier, the improvement wherein the remote sense amplifier is downstream of the error amplifier.

16. A system for regulating the output of an adaptive power supply as a function of a line voltage measured between a pair of conductors connected to the power supply at a point where the voltage between the ground reference at the point of the line voltage measurement and the ground reference at the power supply is non-zero, comprising:
   an error amplifier including:
      a first input terminal for receiving a predetermined reference voltage measured relative to the ground reference at the point of said line voltage measurement; and
      a second input terminal for receiving said line voltage,
      whereby said error amplifier produces an error voltage responsive to the difference between said predetermined reference voltage and said line voltage, said error voltage being measured relative to the ground reference at the point of said line voltage measurement; and
   a remote sense feedback amplifier including:
      a first input terminal for receiving said error voltage; and
      a second input terminal for receiving a first voltage representative of the voltage between the ground reference at the point of the line voltage measurement and the ground reference at the power supply,
      said remote sense amplifier transforming said error voltage from being referenced to the ground reference at the point of the line voltage measurement to being referenced to the ground reference of said adaptive power supply to thereby produce a control voltage;
   said control voltage being applied to said adaptive power supply to regulate the output of said adaptive power supply as a function of said line voltage measurement.

17. The system of claim 16 wherein said adaptive power supply is a switching power converter.

18. A method for regulating the output of an adaptive power supply comprising:

provantes terminals at a first ground reference connected to said power supply at a second ground reference;

measuring the line voltage at said terminals;

providing a predetermined reference voltage at said first ground;

comparing said line voltage with said reference voltage to thereby produce a first error voltage relative to said first ground;

translating said first error voltage to a second error voltage relative to said second ground; and applying said second error voltage to said adaptive power supply to regulate said adaptive power supply.

19. The method of claim 18 wherein the voltage between said first ground and said second ground is non-zero.

20. The method of claim 18 wherein said first ground is at a greater electrical potential than said second ground.

21. The method of claim 18 wherein said adaptive power supply is a switching power converter.

* * * * *